May 3, 1960  R. A. SANDBERG  2,934,972
PARKING BRAKE ASSEMBLY
Filed Dec. 15, 1955  2 Sheets-Sheet 2
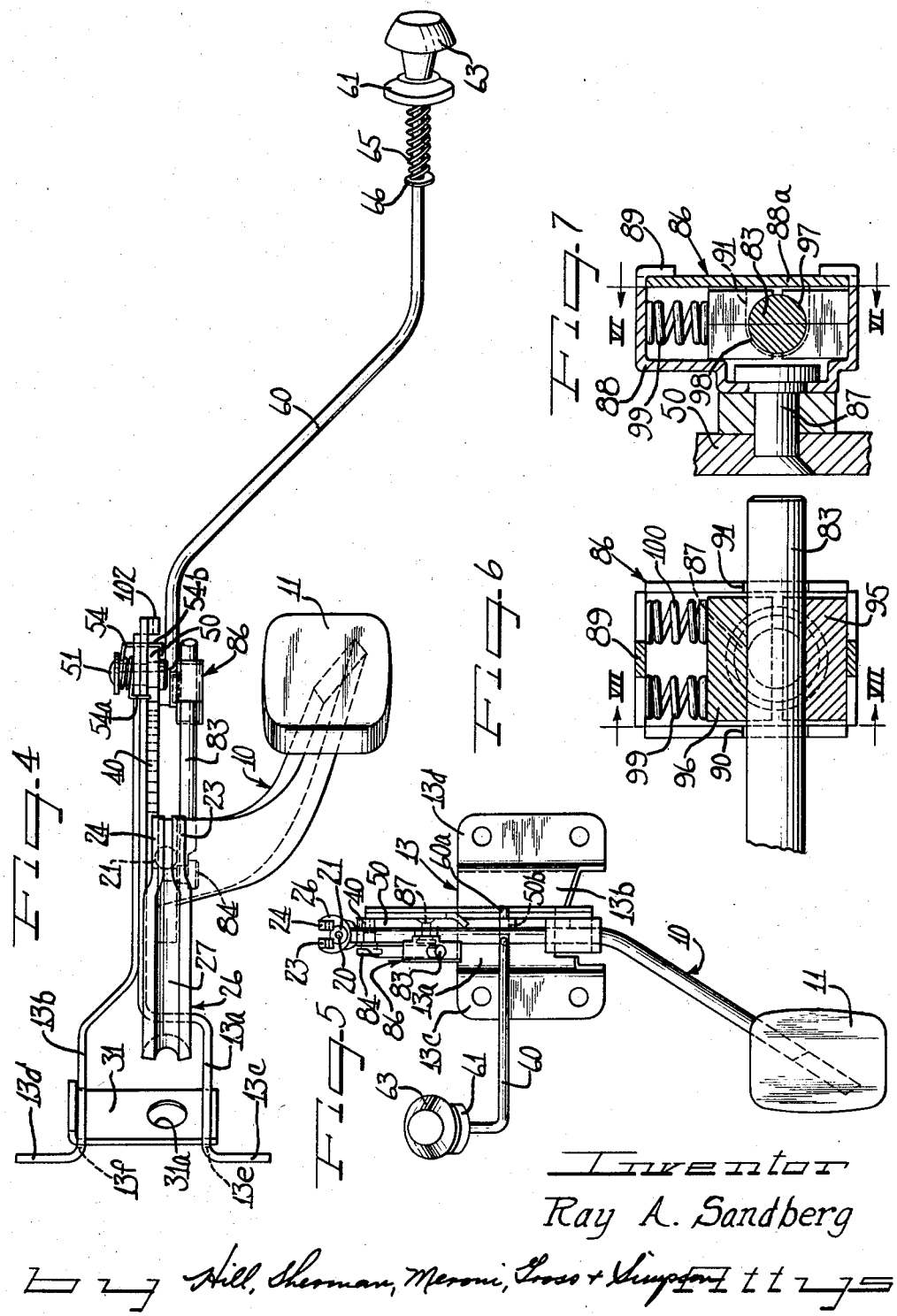
Inventor
Ray A. Sandberg United States Patent Office 2,934,972
Patented May 3, 1960

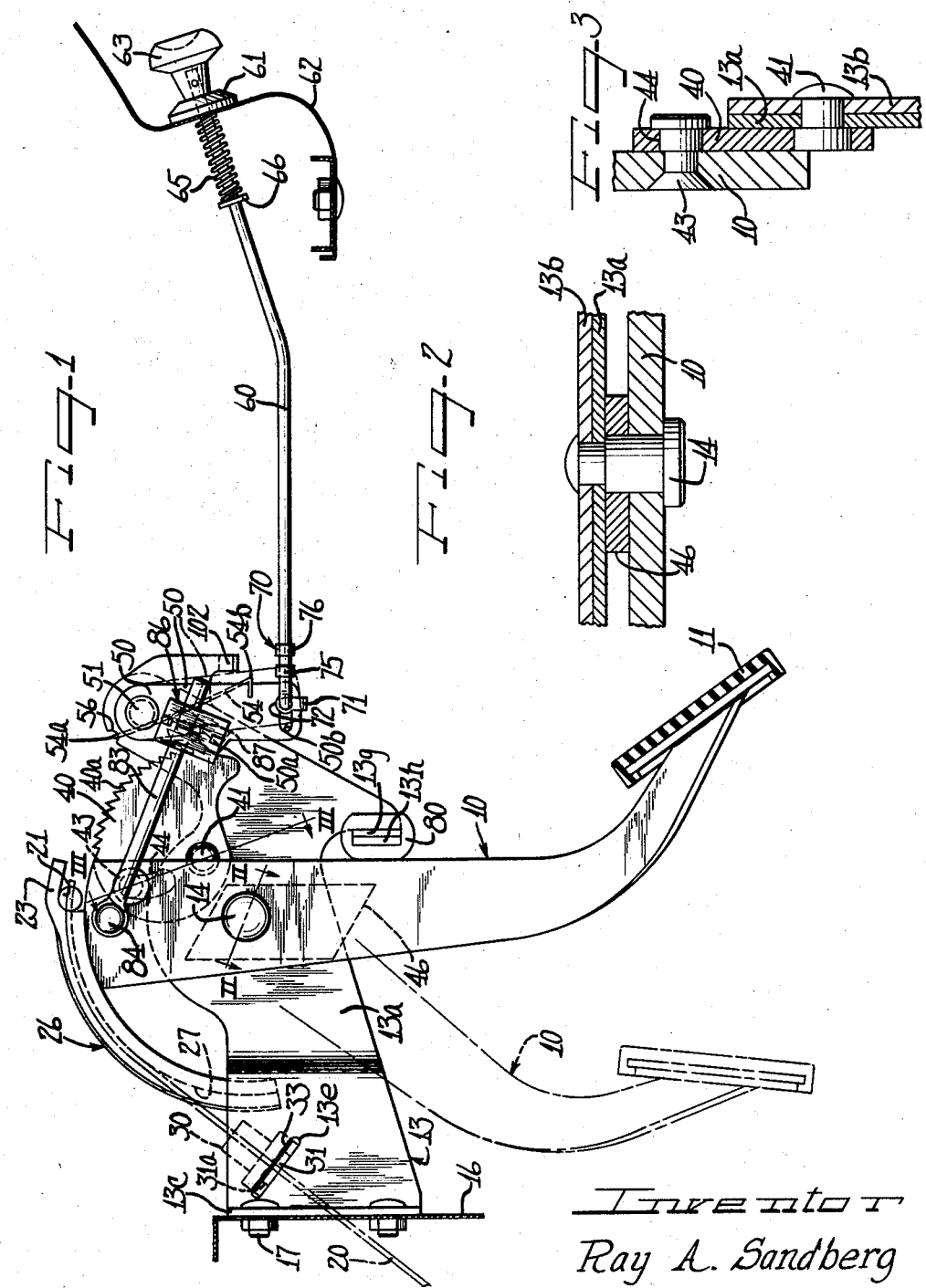

2,934,972
PARKING BRAKE ASSEMBLY

Ray A. Sandberg, Waukegan, Ill., assignor, by mesne assignments, to The Bingham-Herbrand Corporation, a corporation of Ohio Application December 15, 1955, Serial No. 553,321

8 Claims. (Cl. 74—541)

This invention relates to a parking brake assembly, and particularly to a parking brake assembly provided with means for silencing a pawl and ratchet means or the like during application of the brakes.

It is an important object of the present invention to provide a novel and improved parking brake assembly having incrementally operating means for selectively retaining the brakes in successive actuated conditions, and means for disabling the retaining means as the brakes are being applied.

It is another important object of the present invention to provide a parking brake assembly having ratchet and pawl means for retaining the assembly in an attained brake setting position, but wherein means is provided for silencing the ratcheting action of the ratchet and pawl means during application of the brakes.

Other and further objects, features and advantages of the present invention will become apparent from the following detailed description taken in connection with the accompanying drawings, in which:

Figure 1 is a side elevational view of a parking brake assembly in accordance with the present invention and showing associated parts of the vehicle in section;

Figure 2 is a fragmentary enlarged cross sectional view taken generally along the line II—II of Figure 1;

Figure 3 is a fragmentary enlarged cross sectional view taken generally along the line III—III of Figure 1;

Figure 4 is a top plan view of the assembly of Figure 1;

Figure 5 is an end elevational view of the structure of Figure 1;

Figure 6 is an enlarged fragmentary vertical sectional view of the friction box silencing mechanism in accordance with the present invention and corresponding to the section line VI—VI of Figure 7; and Figure 7 is a fragmentary vertical sectional view taken generally along the line VII—VII of Figure 6 and illustrating the pivotal connection of the friction box with the pawl.

As shown on the drawings:

The invention is illustrated as it might be applied to a foot operated parking brake including a pivotally mounted brake actuating lever 10 having a foot pad 11 carried at the lower end thereof for depression by the left foot of the operator of the vehicle with which the assembly is associated to apply a brake setting force. The brake lever 10 is pivotally mounted to a bracket 13 by means of a rivet 14, and the bracket 13 may comprise a pair of bracket plate portions 13a and 13b, Figure 4, having turned mounting flanges 13c and 13d secured to the fire wall 16 of the vehicle by suitable fastening elements such as indicated at 17.

For transmitting the arcuate movement of the brake lever 10 about the pivot 14 to the brakes, a brake actuating cable 20 has its ball end 21 engaged under respective flange extensions 23 and 24 of a cable guide structure 26 which is secured to the upper end of the brake lever 10. As seen in Figure 4, the guide structure 26 provides a groove 27 for receiving the cable 20 and for confining the cable laterally. The groove 27 is formed on an arc about the pivot 14, and the cable 20 extends tangentially from the groove 27 through a bushing 30 mounted on a support plate 31 having an aligned cable receiving aperture 31a as seen in Figure 4. The plate 31 extends through aligned slots 13e and 13f in the bracket portions 13a and 13b and may be welded to the bracket portion 13a as indicated at 33 in Figure 1.

For cooperation in maintaining the brake lever 10 in a brake setting position to which it is advanced by the operator, a ratchet sector 40 is pivotally mounted to the bracket portions 13a and 13b by means of a rivet 41. The ratchet sector 40 is coupled to the brake lever 10 by means of a rivet 43 and rides in an arcuate slot 44 in the ratchet sector 40 to accommodate relative movement between the brake lever 10 and the ratchet sector as the brake lever is moved to brake setting position. As illustrated in Figures 1 and 2, a spacer plate 46 may be interposed between the lever 10 and the bracket portion 13a and 13b to accommodate the ratchet sector 40 between the bracket portions and the lever 10 as illustrated in Figure 3. A pawl member 50 is pivotally mounted on the bracket portions 13a and 13b by means of a rivet 51 and has a tooth 50a for cooperating with the teeth 40a of ratchet sector 40 in maintaining the brake lever 10 in a brake setting position. It will be understood that the bracket portions 13a and 13b may be spot welded together where they are in contact for greater rigidity. As seen in Figures 1 and 4, a wire spring 54 is wrapped around the shank of rivet 51 and has one end portion 54a seated in cooperating notches indicated at 56 in Figure 1 in the bracket portions 13a and 13b and has an opposite end portion 54b engaging a rear edge of the pawl member 50 to urge the same into engaging relation to the ratchet member 40.

For releasing the pawl member 50 from retaining relation to the ratchet teeth 40a, a release rod 60 is provided guided at its rear end by a collar member 61 secured with the instrument panel 62 of the vehicle and having a knob 63 at the rear end thereof for retraction to pivot the pawl member 50 out of retaining relation to the ratchet 40. Compression spring means 65 is adapted to engage the panel 62 at one end and to engage a ring 66 secured to the rod 60 at the other end to urge the rod 60 in the direction to accommodate engagement of the pawl member 50 with the ratchet 40. The rod 60 has an inturned forward end portion 60a, Figure 5, extending through an elongated slot 50b, Figure 1, in the pawl member 50. A clip member 70, Figure 1, includes a U-shaped bracket 71 having upstanding portions such as 72 extending on opposite sides of the pawl member 50 and having apertures aligned with the slot 50b for extension of the turned end portion 60a of rod 60 through an aperture of one of the upstanding portions 72, then through the slot 50b and then through the aperture of the other upstanding portion of the U-shaped bracket portion 71. A pair of clip portions 75 and 76 are carried on a longitudinal body portion extending from the outer upstanding portion 72 on the inner side of the rod 60, the clips 75 and 76 snapping into engagement with the rod 60 to retain the rod in the relation shown to the pawl member 50 and to prevent disengagement of the rod turned end portion 60a from the slot 50b. For cushioning the return of the brake lever 10 to release position, turned portions 13g and 13h of bracket portion 13a and 13b may carry a bumper which may be a rubber hose slipped over the free end of the portions 13g and 13h.

For silencing the ratcheting action of the pawl member 50 relative to the ratchet teeth 40a as the brake lever 10 is moved to brake setting position, the brake lever 10 is frictionally coupled to the pawl member 50 in such a manner as to maintain the pawl member out of engageable relation to the ratchet member 40 as the brake lever 10 is moved in the brake setting direction, but to accommodate immediate engagement of the pawl member 50 with the ratchet 40 as the operator releases his foot from the foot pad 11 with the brake lever 10 in the brake setting position desired. To this end a coupling rod 83 is pivotally connected to the brake lever 10 by means of a rivet 84 and the free end of the rod 83 is coupled to the pawl member 50 by means of a friction device 86 pivotally carried on the pawl 50 by means of a rivet 87.

As illustrated in Figures 6 and 7, the friction device 86 specifically includes a housing part 88 having a cover plate 88a secured therewith by means of tabs 89 to define a box like housing having apertures 90 and 91 in respective side walls thereof to receive the end of coupling rod 83 therethrough. Within the housing are a pair of friction blocks 95 and 96 having arcuate channels 97 and 98 of slightly less than semi-circular configuration for receiving the end of rod 83 in frictional sliding relation therealong. Springs 99 and 100 urge the block 96 against the top of the rod 83 to provide the frictional coupling between the device 86 and the rod 83 as the rod 83 moves through the housing during application of the brakes. The sliding friction developed between the rod 83 and the device 86 is sufficient to overcome the force of spring 54 and to hold the pawl 50 out of engageable relation to the ratchet teeth 40a while the brake lever 10 is being moved to brake setting position. The elongated slot 50b allows the pawl 50 to be held out of engageable relation to the ratchet sector 40 without any movement of the rod 60, and stop portion 102 of bracket portion 13a is disposed to limit pivotal movement of the pawl member 50 in the direction away from the ratchet 40. As soon as the operator ceases depressing the foot pad 11 and begins to release his foot from the foot pad 11, the slight counterclockwise movement of the brake lever 10 pulls the pawl member 50 into engaged relation with the ratchet sector 40 due to the frictional coupling by means of the rod 83 and friction device 86.

Summary of operation

By way of summary, when it is desired to apply the brakes, the operator of the vehicle may place his left foot on the pad 11 and depress the same to pivot the lever 10 in the clockwise direction retracting the cable 20 to actuate the brakes. The rod 83 in cooperation with the friction device 86 maintains the pawl 50 out of engageable relation to the teeth of ratchet 40 during the time the brake lever 10 is being moved by virtue of the frictional sliding relation therebetween. As soon as the operator begins to release his foot from the pad 11, the pawl tooth 50a is moved into engagement with the adjacent ratchet tooth 40a to retain the brake lever 10 in the desired brake setting position. In this way, the ratcheting action of the pawl 50 is silent, and the pawl tooth 50a does not ride over each successive tooth of the ratchet 40 during application of the brake, but is selectively moved into engagement with the desired ratchet tooth at the end of the brake setting movement of the brake lever 10.

It is apparent that the present invention is also applicable to the ratchet and pawl mechanism of a straight pull brake lever structure and to other parking brake structures where it is desired to achieve silent operation or to disable an incrementally operable retaining mechanism.

It may be noted that pawl spring 54 is unnecessary to the operation of the illustrated embodiment and may be omitted since the frictional force between coupling rod 83 and device 86, by itself, will move pawl 50 into engagement with ratchet sector 40 after brake lever 10 has been moved to a brake setting position and begins to move in brake release direction as the operator releases his foot from pedal 11. Also flanges 23 and 24 may be hand formed inwardly around cable ball 21 after assembly of the cable with guide 26 to prevent the cable from becoming unthreaded from guide 26 should the cable freeze to bushing 30, Figure 1, for example, in brake setting position of lever 10 and the lever 10 be released while the cable is still frozen to bushing 30.

Many other modifications and variations may be effected without departing from the scope of the novel concepts of the present invention.

I claim as my invention:

1. In a brake assembly, brake applying means including a foot-operated lever pivotally supported intermediate its ends for movement to a brake-setting position, a pair of interengageable retaining members for retaining said brake applying lever in said brake setting position, means connecting one end of the lever with brake mechanism to be actuated, and friction coupling means interposed between one of said interengagement members and said applying means to move said one interengageable member to a position out of engageable relation to the other of said interengageable members and for thereafter accommodating relative movement between said applying means and said one interengageable means while maintaining said one interengageable means in said position out of engageable relation to said other interengageable means, and control means operable independently of said friction coupling means for disengaging the members to release said lever from brake setting position.

2. In a brake applying system, bracket means for mounting in a vehicle, a foot-operated brake lever pivoted to said bracket means for arcuate movement in a brake setting direction to apply a progressively increasing brake actuating force, first incrementally acting retaining means coupled to said brake lever for movement therewith, second incrementally acting retaining means coupled to said bracket means and movable from a first position in engageable relation with said first retaining means to a second position out of engageable relation to said first retaining means, and means connected between said brake lever and said second retaining means and operable to maintain said second retaining means in said second position as said brake lever is moved in the brake setting direction, but operable to move said second retaining means to said first position as said brake lever begins to move in the opposite brake release direction.

3. In a brake applying system, bracket means for mounting in a vehicle, a brake lever movably mounted by said bracket means for movement in a brake setting direction to apply a progressively increasing brake actuating force, ratchet means coupled to said brake lever for movement therewith, pawl means carried by said bracket means and in one position cooperable with said ratchet means to retain said brake lever in successive incremental brake setting positions, and friction coupling means interposed between said brake lever and said pawl means for moving said pawl means out of engageable relation to said ratchet means by movement of said brake lever in the brake setting direction and for thereafter accommodating relative movement between said brake lever and said pawl means, said coupling means accommodating movement of said pawl means into engageable relation to said ratchet means as said brake lever is released and begins to move in the opposite brake release direction.

4. In a brake lever assembly, bracket means for mounting in a vehicle, brake lever means mounted by said bracket means for movement in a brake setting direction to apply a progressively increasing brake actuating force, ratchet means coupled to said brake lever for movement therewith as the brake lever is moved in the brake setting direction, pawl means carried by the bracket means in one position cooperating with said ratchet means to prevent movement of said lever in the reverse brake release direction and in a second position being out of engageable relation to said ratchet means, rod means pivotally connected to said lever, friction means carried by said pawl means and receiving the free end of said rod means in sliding relation, and said rod and friction means being operable to hold said pawl means out of engageable relation to said ratchet means as said lever is moved in the brake setting direction but operable to accommodate interengagement of said pawl means and ratchet means as said lever begins to move in the opposite brake release direction.

5. In a brake applying assembly, brake applying means, means mounting said brake applying means for movement in a brake setting direction to apply a progressively increasing brake actuating force, ratchet means coupled to said brake applying means for movement therewith as the brake applying means is moved in the brake setting direction, pawl means carried by said mounting means and operable to retain said brake applying means in a brake setting position, release means coupled to said pawl means for moving said pawl means out of engageable relation to said ratchet means to release said brake applying means for movement to brake release position, and friction coupling means between said brake applying means and said pawl means for moving said pawl means out of engageable relation to said ratchet means independently of movement of said release means as said brake applying means is moved in the brake setting direction.

6. In a brake applying mechanism, bracket means for mounting in a vehicle, a brake lever arm pivoted to said bracket means for arcuate movement in a brake setting direction to apply a progressively increasing brake setting force, ratchet means pivoted to said bracket means and coupled to said brake lever arm for pivotal movement as said brake lever arm is moved in the brake setting direction, pawl means pivotally mounted by said bracket means and in one position being engageable with the successive teeth of said ratchet means as the brake lever arm is moved in brake setting direction, release means coupled to said pawl means by means of an elongated slot accommodating movement of said pawl means to a position out of engageable relation to said ratchet means with said release means in position to accommodate engagement between said pawl means and said ratchet means, and a friction coupling device between said brake lever arm and said pawl means operative to shift said pawl means relative to said release means to move said pawl means out of engageable relation to said ratchet means and to hold said pawl means out of engageable relation to said ratchet means as said brake lever arm continues to move in the brake setting direction, said friction device accommodating movement of said pawl means into engagement with said ratchet means when said brake lever arm is released and begins to move in the opposite brake release direction.

7. In a brake assembly, a support, brake applying means including a foot-operated lever fulcrumed intermediate its ends upon the support for movement to a brake setting position, ratchet and pawl means for maintaining said foot-operated lever in said brake setting position, members connected respectively with said lever and said pawl means, means urging said members into frictional engagement, one of said members being slidable and pivoted relative to the other and frictionally supported thereby, whereby to bias said pawl means out of engageable relation with said ratchet means until the brake applying lever has completed its movement in the brake setting direction.

8. In a brake applying system, brake applying means including a foot-operated lever fulcrumed intermediate its ends movable to a brake-setting position, ratchet and pawl means operable to retain said brake applying lever in said brake setting position, friction means including friction shoes associated with said pawl means, a member pivotally connected to said applying means and frictionally supported by said shoes to move said pawl means to a position out of engageable relation to said ratchet means and said friction means being operative to thereafter accommodate relative movement between said applying means and said pawl means as said applied means is further moved toward said brake setting position.

References Cited in the file of this patent
UNITED STATES PATENTS

| | | |
|---|---|---|
| 169,574 | Parr | Nov. 2, 1875 |
| 1,150,587 | Falkenau | Aug. 17, 1915 |
| 1,302,112 | Wilkins et al. | Apr. 29, 1919 |
| 1,391,948 | Gledhill | Sept. 27, 1921 |
| 1,657,738 | Booth | Jan. 31, 1928 |
| 2,130,187 | Jandus | Sept. 13, 1938 |
| 2,258,007 | Gonderman | Oct. 7, 1941 |
| 2,272,174 | Jandus | Feb. 10, 1942 |
| 2,281,155 | Jandus | Apr. 28, 1942 |
| 2,467,557 | Jandus | Apr. 19, 1949 |
| 2,694,945 | Jandus | Nov. 23, 1954 |
| 2,835,140 | Cox | May 20, 1958 |
| 2,851,900 | Powell | Sept. 16, 1958 |

FOREIGN PATENTS

| | | |
|---|---|---|
| 274,670 | Great Britain | July 28, 1927 |
| 636,453 | France | Jan. 12, 1928 |